March 3, 1931.   F. PORTUESI   1,794,731
ORNAMENTAL FABRIC AND METHOD OF MAKING AND APPLYING THE SAME Filed Nov. 6, 1928

Inventor
F. Portuesi.
By M. K. Saunders
Attorney

Patented Mar. 3, 1931

1,794,731

UNITED STATES PATENT OFFICE

FELIX PORTUESI, OF HIGHLAND PARK, MICHIGAN

ORNAMENTAL FABRIC AND METHOD OF MAKING AND APPLYING THE SAME

Application filed November 6, 1928. Serial No. 317,669.

This invention relates to fabrics to be applied to a background for the purpose of ornamentation, to the method of making such fabric and applying the same to the background to be ornamented, and the object of my invention is to provide such a fabric which can be economically manufactured and easily applied.

Another object of my invention is to provide a laminated fabric which may be manufactured and sold by the piece and from which ornamental forms may be cut and easily applied to the desired surface.

Another object of my invention is the provision of a simple and economical method of manufacturing my improved fabric.

Figure 1:
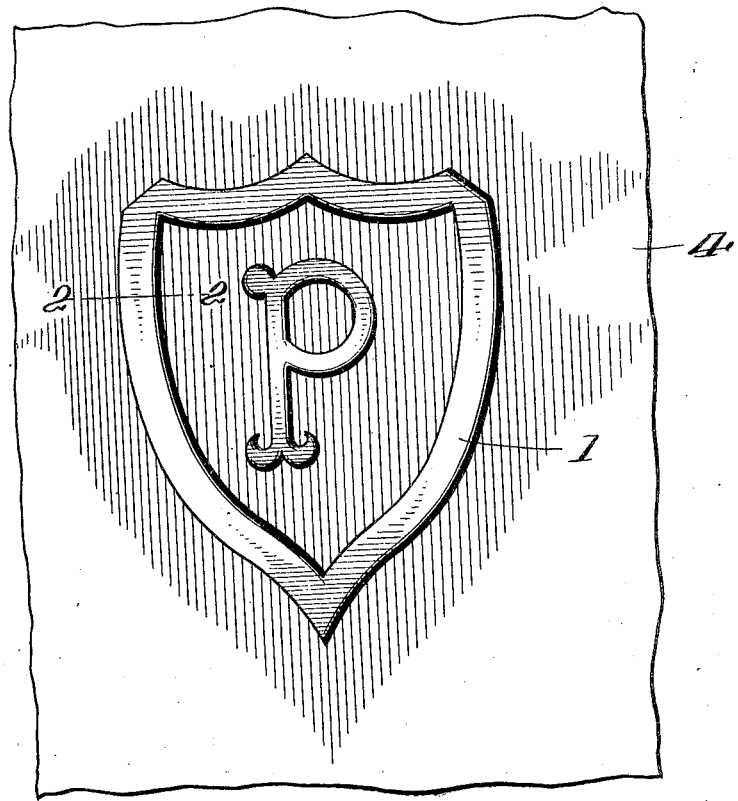
Figure 2:
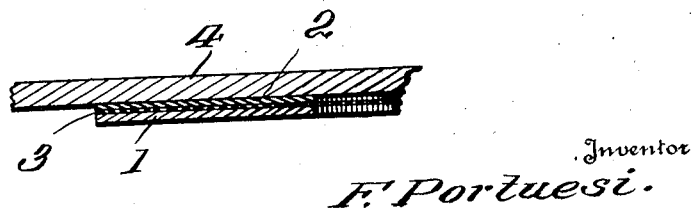

I attain the above and other objects of the invention, which will be apparent as the description proceeds, by means of the construction shown in the accompanying drawings, in which Figure 1 illustrates a background ornamented by the application of my improved fabric; and Figure 2 is a section on the line 2—2 of Figure 1.

On the drawings, in which like reference characters indicate like parts on all of the views thereof, 1 indicates the ornamental layer of my improved fabric, 2 indicates a layer of rubber tissue and 3 indicates a layer of adhesive for attaching the ornamental layer to the layer of rubber tissue. 4 indicates the background to which the ornamental fabric is applied. The layer 2 is preferably a thin fabric impregnated with a rubber cement which will soften when heat is applied and harden at atmospheric temperature.

In manufacturing my improved fabric I take a layer of rubber tissue and cover one surface thereof with a suitable adhesive such as carpenter's glue, after which a piece of cheese cloth is pressed on to the adhesive while it is still tacky, the cheese cloth being quickly removed. The cheese cloth will absorb any superfluous adhesive and leave a thin, uniform layer of the adhesive over the entire surface of the rubber tissue. The ornamental fabric layer is then placed upon and pressed evenly onto the tacky adhesive surface so that a closely united laminated fabric results which is composed of the ornamental layer and rubber tissue.

In order to apply my improved fabric to the surface to be ornamented, the desired designs are cut out thereform and placed on the background 4 which it is desired to ornament.

Heat is then applied by means of a heated sad-iron or similar tool which will soften the rubber tissue and provide a means for uniting the ornamental fabric to the back ground. Owing to the fact that only a very thin layer of adhesive is used, it will not penetrate the ornamental layer and detract from its appearance. This layer of adhesive also prevents the rubber tissue, when softened by heat, from penetrating the ornamental layer and spotting the same.

My improved fabric is especially adapted for use in applying a gold or silver tissue or similar ornamental fabric to velvet or silk for the production of theater curtains.

While I have indicated the preferred materials which produce the improved fabric it is to be understood that I do not desire to limit my invention except within the scope of the appended claims.

Having thus described my invention what I claim as new and desire to secure by Letters Patent of the United States, is—

1. In a method of making a decorative cut out design the step of coating a layer of rubber tissue with an adhesive, the step of placing a layer of absorbent material temporarily on said adhesive coating while it is tacky and removing the same, then the step of placing a layer of ornamental fabric on said adhesive coated rubber tissue, and the step of cutting out a design from the united ornamental fabric layer and rubber tissue layer.

2. An ornamental fabric design adapted to be secured to a background, said fabric design consisting of an ornamental fabric layer, a layer of rubber impregnated fabric capable of being softened by heat and a layer of adhesive unaffected by heat and impervious to the softened rubber, said adhesive uniting said ornamental fabric layer and said rubber impregnated fabric.

In testimony whereof I hereunto affix my signature.

FELIX PORTUESI.